United States Patent [19]
Matsumoto

[11] Patent Number: 5,853,771
[45] Date of Patent: Dec. 29, 1998

[54] MOLDING DIE SET AND MOLD PACKAGE

[75] Inventor: Jirou Matsumoto, Tokyo, Japan

[73] Assignee: Oki Electric Industry Co., Ltd., Tokyo, Japan

[21] Appl. No.: 62,972

[22] Filed: Apr. 21, 1998

[30] Foreign Application Priority Data

Aug. 19, 1997 [JP] Japan .................................. 9-222514

[51] Int. Cl.$^6$ ........................... B29C 45/02; B29C 45/14; B29C 45/27
[52] U.S. Cl. .......................... 425/116; 425/117; 425/544; 425/572; 425/588; 264/272.17; 264/328.9; 264/328.12
[58] Field of Search .................................... 425/116, 117, 425/121, 544, 572, 588, DIG. 228; 264/272.17, 328.9, 328.12

[56] References Cited

U.S. PATENT DOCUMENTS

| 3,635,220 | 1/1972 | Izumi et al. | 425/116 |
| 5,197,183 | 3/1993 | Chia et al. | 264/328.12 |
| 5,732,156 | 3/1998 | Matumoto | 425/116 |
| 5,750,153 | 5/1998 | Shibata | 425/116 |

FOREIGN PATENT DOCUMENTS

| 54-152970 | 12/1979 | Japan | 264/272.17 |
| 55-140541 | 11/1980 | Japan | 264/272.17 |
| 2-9142 | 1/1990 | Japan | 264/272.17 |
| 6-45379 | 2/1994 | Japan | 264/272.17 |

*Primary Examiner*—Khanh P Nguyen
*Attorney, Agent, or Firm*—Jones & Volentine, L.L.P.

[57] ABSTRACT

A molding die set includes an upper die having an upper cavity; and a lower die including a lower cavity to be arranged to face the upper cavity, and a gate which guides plasticized resin into the lower cavity and the upper cavity. The lower cavity is provided with a projection region which is projecting inwardly. The gate is arranged to be extending in the projection region.

21 Claims, 10 Drawing Sheets

MOLDING DIE SET AND MOLD PACKAGE

CROSS REFERENCE TO RELATED APPLICATION

This application claims the priority of Application No. H09-222514, filed Aug. 19, 1997 in Japan, the subject matter of which is incorporated herein by reference.

TECHNICAL FIELD OF THE INVENTION

The present invention relates to a transfer molding process for fabricating a mold package, which protects an IC (Integrated Circuit). More particularly, the present invention relates to a molding die set used in the transfer molding process.

BACKGROUND OF THE INVENTION

In the transfer molding process using thermosetting resin, a die set, including an upper die and a lower die, is employed. The upper die includes an upper cavity and a cull. The lower die includes a pot which is connected to the cull, a runner which is connected to the cull, a gate which is connected to the runner, and a lower cavity which is connected to the gate. In general, the upper and lower cavities are shaped to have rectangular openings, and the gate is arranged at a shorter side of the lower cavity.

In fabrication, when a lead frame with the IC is set in the lower die, a tablet of the thermosetting resin is supplied into the pot, then the upper die is put over the lower die so that the upper and lower cavities face to each other. The thermosetting resin tablet, supplied into the pot, is heated to be plasticized, then the plasticized resin is supplied through the cull, the runner and the gate into the upper and lower cavities. The upper and lower cavities are filled with the plasticized resin. While the plasticized resin is transferred into the upper cavity and the lower cavity, the resin is applied with an appropriate pressure. When the resin in the upper cavity and the lower cavity is set, the upper cavity is taken off and the lead frame is taken out from the lower die. After that, the resin left in the runner and the cull is removed.

In a conventional technology of molding process, when the plasticized resin is transferred from the gate toward the upper and lower cavities, the resin tends to flow down into the lower cavity first, then go into the upper cavity. That is because, the transfer speed of the plasticized resin is decreased between the gate and an inner lead that separates the upper cavity and the lower cavity. In this case, an air vent, arranged at the opposite side of the gate, may be sealed with the resin before the upper cavity is filled with the plasticized resin, so that the air may be left in the cavities. The left air makes voids in the completed mold package, and therefore the IC in the mold package may not operate with high reliability.

OBJECTS OF THE INVENTION

Accordingly, an object of the invention is to provide a molding die set which contributes to fabricate a high quality mold package.

Another object of the invention is to provide a high quality mold package itself.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

According to a first aspect of the invention, a molding die set includes an upper die having an upper cavity; and a lower die including a lower cavity to be arranged to face the upper cavity, and a gate which guides plasticized resin into the lower cavity and the upper cavity. The lower cavity is provided with a projection region which is projecting inwardly. The gate is arranged to be extending in the projection region.

A mold package according to a second aspect of the invention is fabricated using the molding die set, according to the first aspect of the invention.

A molding system according to a third aspect of the invention includes the molding die set, according to the first aspect of the invention.

In each of the above described aspects of the invention, preferably, the gate is arranged close to an inner lead of the IC so that the resin is equally transferred into the upper cavity and the lower cavity.

Each of the upper and the lower cavity may be shaped rectangular, and the projection region may be arranged around the center or a corner of a shorter side of the lower cavity. Otherwise, the projection region can be arranged throughout a shorter side of the lower cavity.

The gate may be provided with a bottom surface which is tapered upwardly to the upper cavity. The gate may be provided with side surfaces which are tapered inwardly to the bottom surface thereof.

DETAILED DISCLOSURE OF THE INVENTION

Figure 1:
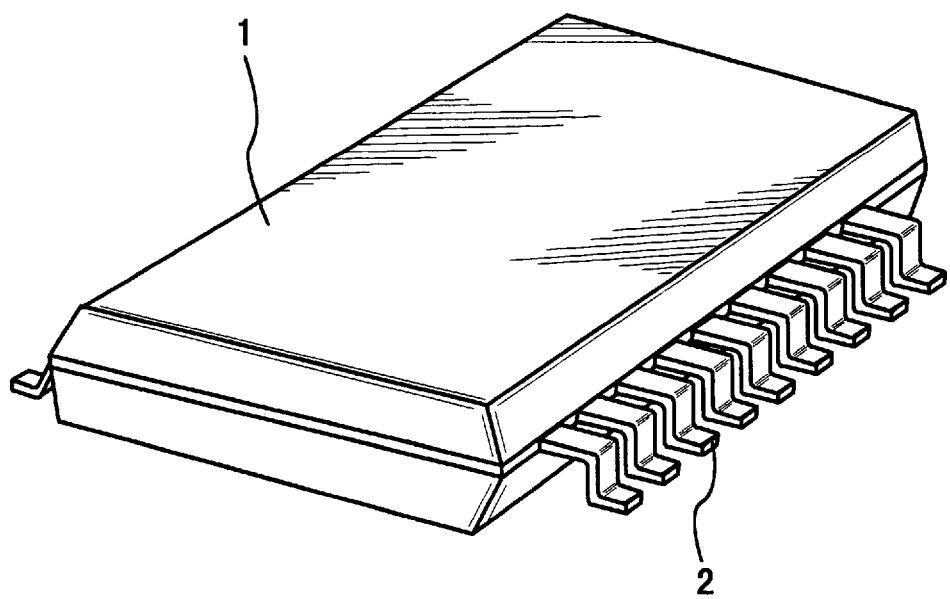
FIG. 1 is a perspective view illustrating an IC package fabricated in accordance with a conventional technology.

For better understanding of the invention, background technology is first described. FIG. 1 shows an IC mold package fabricated with a conventional molding die set (not shown). In fabrication, a lead frame with an IC (Integrated Circuit) is set in a lower die, then a tablet of thermosetting resin is supplied into a pot. Subsequently, an upper die is put over the lower die to cover the IC between them. While the plasticized resin is supplied through a gate into the upper and lower cavities, the resin is applied with some pressure. When the resin in the lower cavity and the upper cavity is set, the upper die is taken off and the lead frame is taken out from the lower die. After that, the resin left in the runner and the cull is removed. In FIG. 1, a reference number 1 represents a mold package, fabricated by the above mentioned conventional way, and a reference number 2 represents leads.

In a conventional technology of molding process, when the plasticized resin is transferred from the gate, the resin tends to flow down into the lower cavity first, then go into the upper cavity. That is because, the transfer speed of the plasticized resin is decreased between the gate and an inner lead that separates the upper cavity and the lower cavity. In this case, an air vent, arranged at the opposite side of the gate, may be sealed with the resin before the upper cavity is filled with the plasticized resin, so that the air may be left in the cavities. The left air makes voids in the completed mold package, and therefore the IC in the mold package may not operate with high reliability.

Figure 2:
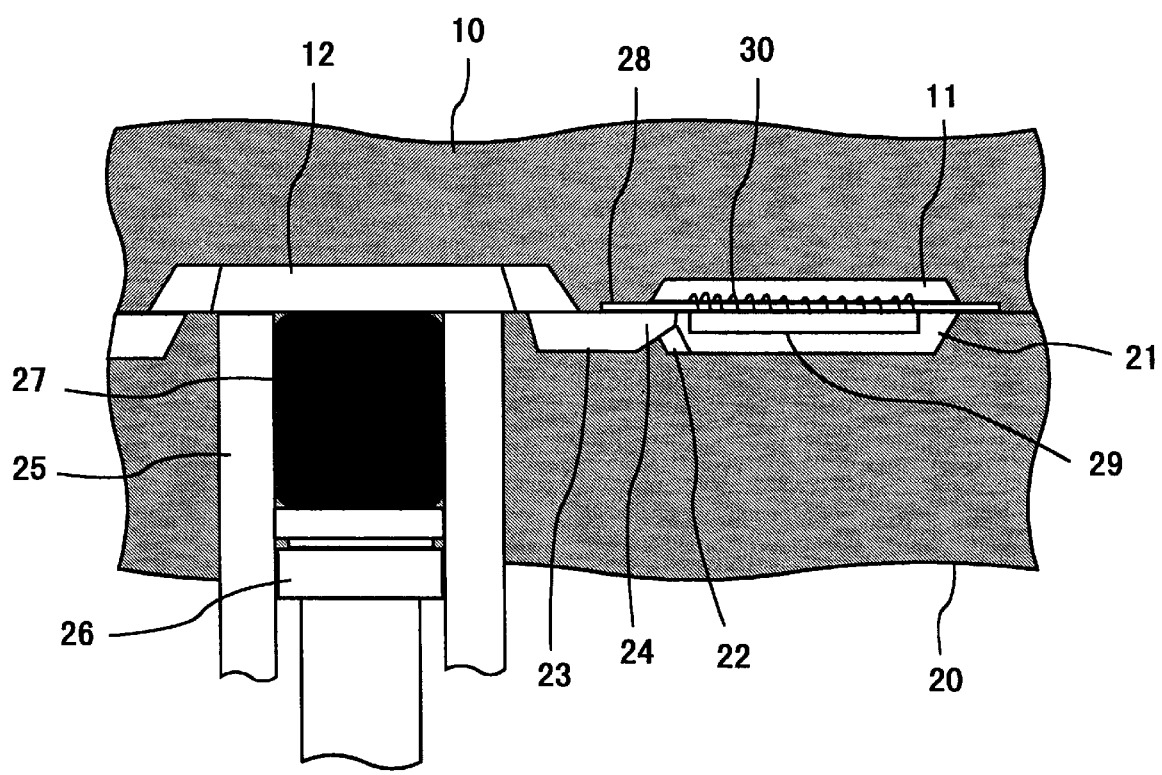
FIG. 2 is a cross-sectional view illustrating a molding die set according to a first preferred embodiment of the invention.
Figure 3:
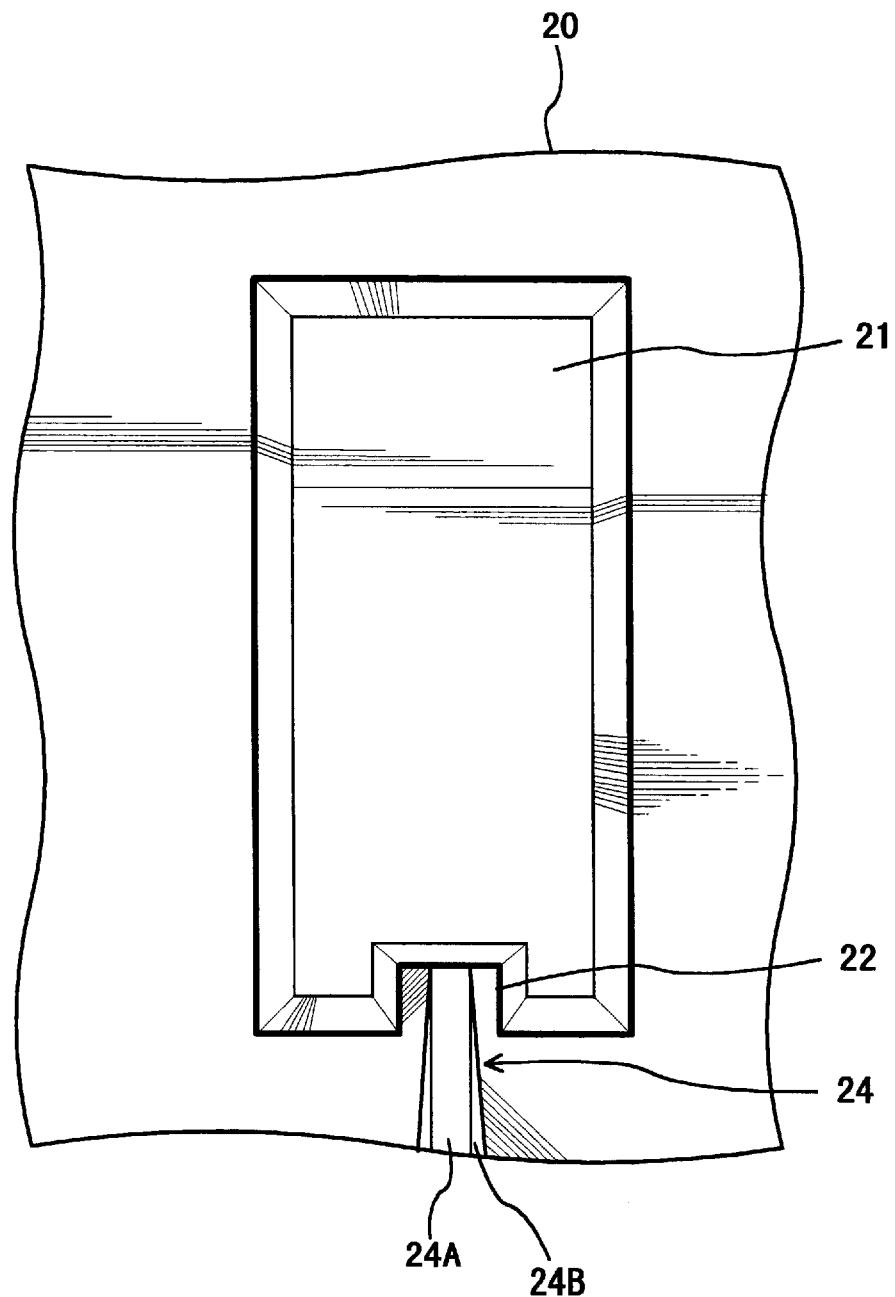
FIG. 3 is a plan view illustrating a lower die of the molding die set, according to the first preferred embodiment of the invention.

FIG. 2 shows a molding die set used for fabricating a mold package (110) protecting an IC 29, according to a first preferred embodiment of the invention. FIG. 3 shows a lower die of the molding die set, shown in FIG. 2. The molding die set includes an upper die 10 having an upper cavity 11, a lower die 20 having a lower cavity 21. The upper cavity 11 and the lower cavity 21 are shaped to have rectangular openings. The upper die 10 is provided with a cull 12. The lower die 20 is provided with a pot 25, which pre-heats a thermosetting resin tablet 27 to make plasticized resin; and a plunger 26, which pushes out the tablet 27 in the pot 25 toward the cull 12. The lower die 20 is also provided with a runner 23, which is connected to the cull 12 of the upper die 10, and a gate 24 connected between the runner 23 and the lower cavity 21. In FIG. 2, a reference number 30 represents a bonding wire.

Now referring to FIG. 3, the lower cavity 21 is provided with a projection region 22 that is projecting inwardly at the center of a shorter side of the lower cavity 21. The projection region 22 is arranged to have an end which is to be positioned close to an inner lead (28A, shown in FIG. 8) of the IC 29. The gate 24 is arranged to extend to the end of the projection region 22. The projection region 22 and the gate 24 are designed so as to transfer the plasticized resin well into the lower cavity 21 and the upper cavity 11. In more detail, the gate 24 is arranged to have the end well close to the IC so that the plasticized resin is transferred or injected toward the inner lead (28A) without losing its transfer speed. As a result, the plasticized resin is branched by the inner lead (28A) and is transferred equally to the upper cavity 11 and the lower cavity 21.

Figure 4:
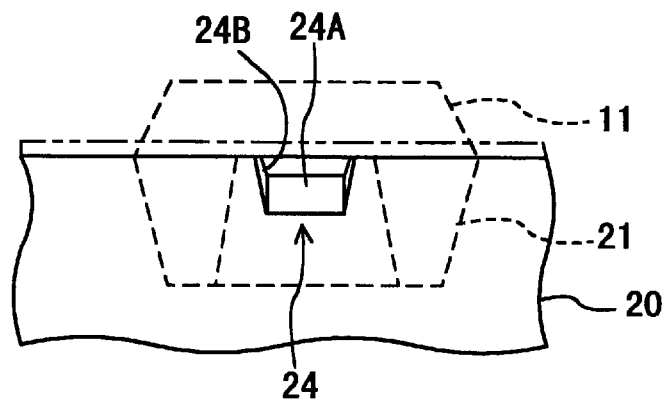
FIG. 4 is a side view illustrating a gate of the lower die, according to the first preferred embodiment of the invention.
Figure 5:
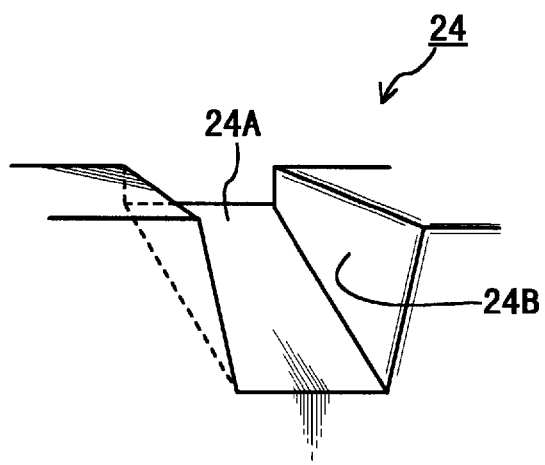
FIG. 5 is a perspective view illustrating the gate of the lower die, according to the first preferred embodiment of the invention.

As shown in FIGS. 4 and 5, the gate 24 has a tapered bottom surface 24A and tapered side surfaces 24B. The bottom surface 24 is tapered upwardly to the upper cavity 21. The side surfaces 24B are tapered inwardly to the bottom surface 24A.

Figure 6:
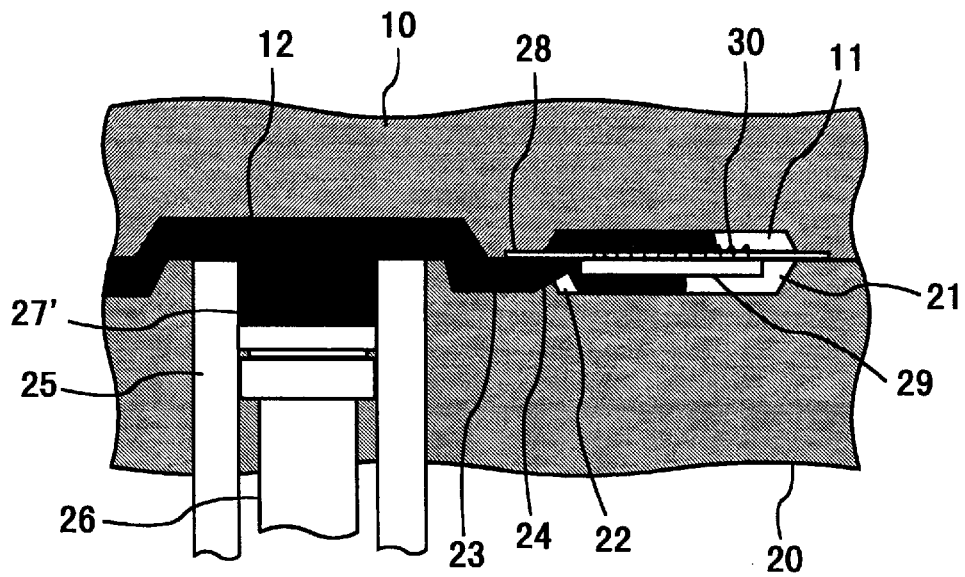
FIGS. 6 and 7 are cross-sectional views illustrating the molding die set according to the first preferred embodiment of the invention.

In fabrication, the lead frame 28 with the IC 29 is first set in the lower cavity 21 of the lower die 20, as shown in FIG. 2, while the thermosetting resin tablet 27 is supplied into the pot 25. Then, the upper die 10 is put over the lower die 20. Next, the resin tablet 27 is heated in the pot 25 to make plasticized resin 27', as shown in FIG. 6. Subsequently, the plasticized resin 27' is pressured out by the plunger 26 to the cull 12.

Figure 8:
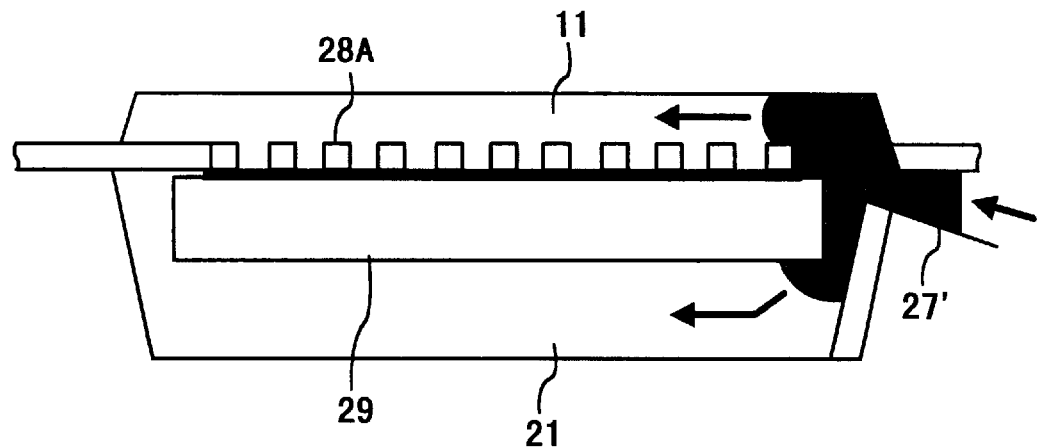
FIG. 8 is a cross-sectional view illustrating the inside of the molding die according to the first preferred embodiment of the invention.

The plasticized resin 27' is transferred through the runner 23 and the gate 24 into the upper and lower cavities 11 and 21. As shown in FIG. 8, in this embodiment, the lower cavity 21 is provided with the projection region 22 and the gate 24 extends into the end of the projection region 22, so that the plasticized resin 27' is transferred toward the inner lead 28A directly. As a result, the plasticized resin 27' is equally transferred into the upper cavity 11 and the lower cavity 21, and therefore, the upper cavity 11 and the lower cavity 21 are filled with the plasticized resin 27' uniformly. In this process the air in the upper and lower cavities 11 and 21 is pressed out by the plasticized resin 27' from an air vent (not shown), arranged at the opposite side of the gate.

Figure 7:
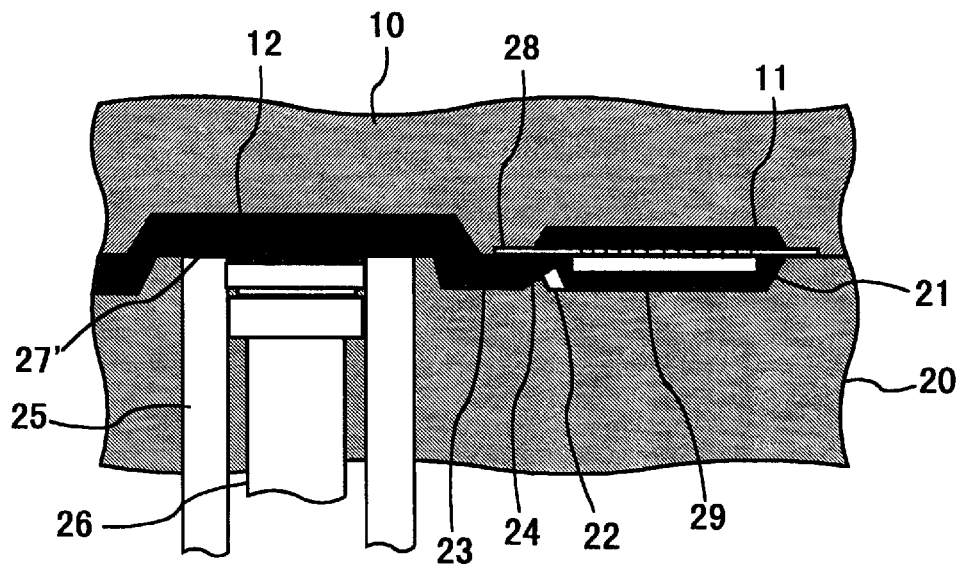

When the plasticized resin 27' is further transferred into the upper and lower cavities 11 and 21, as shown in FIG. 7, the upper and lower cavities 11 and 21 are filled with the resin. In this step, the plasticized resin 27' is uniformly filled in the upper and lower cavities 11 and 21, so that no air is left in the resin 27'. When the resin 27' is set, the molding process is over.

Figure 9:
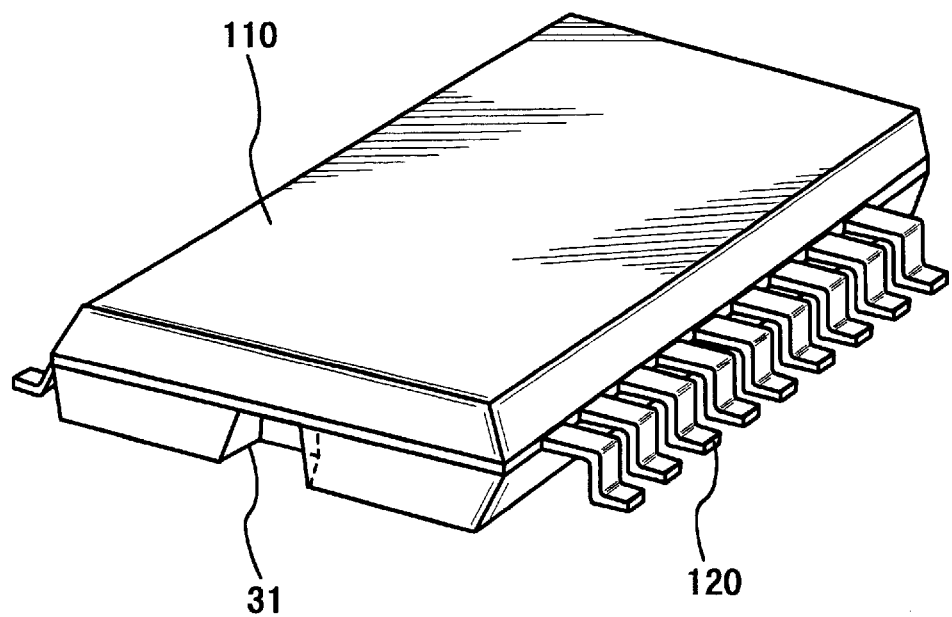
FIG. 9 is a perspective view illustrating a mold package fabricated with the molding die set, according to the first preferred embodiment of the invention.

After that, the upper die 10 and the lower die 20 are separated from each other and the lead frame 28 is taken out from the lower die 20. Then, leads of he lead frame 28 are processed to shape outer leads 120, extending from a mold package 110, as shown in FIG. 9. The mold package 110 is provided with a depressed portion 31, which corresponds to the projection region 22 of the lower die 20.

According to the first preferred embodiment, the chance of voids made in the mold package 110 can be remarkably reduced. And therefore, the IC 29 stored in the mold package 110 can operate with a high reliability.

Figure 10:
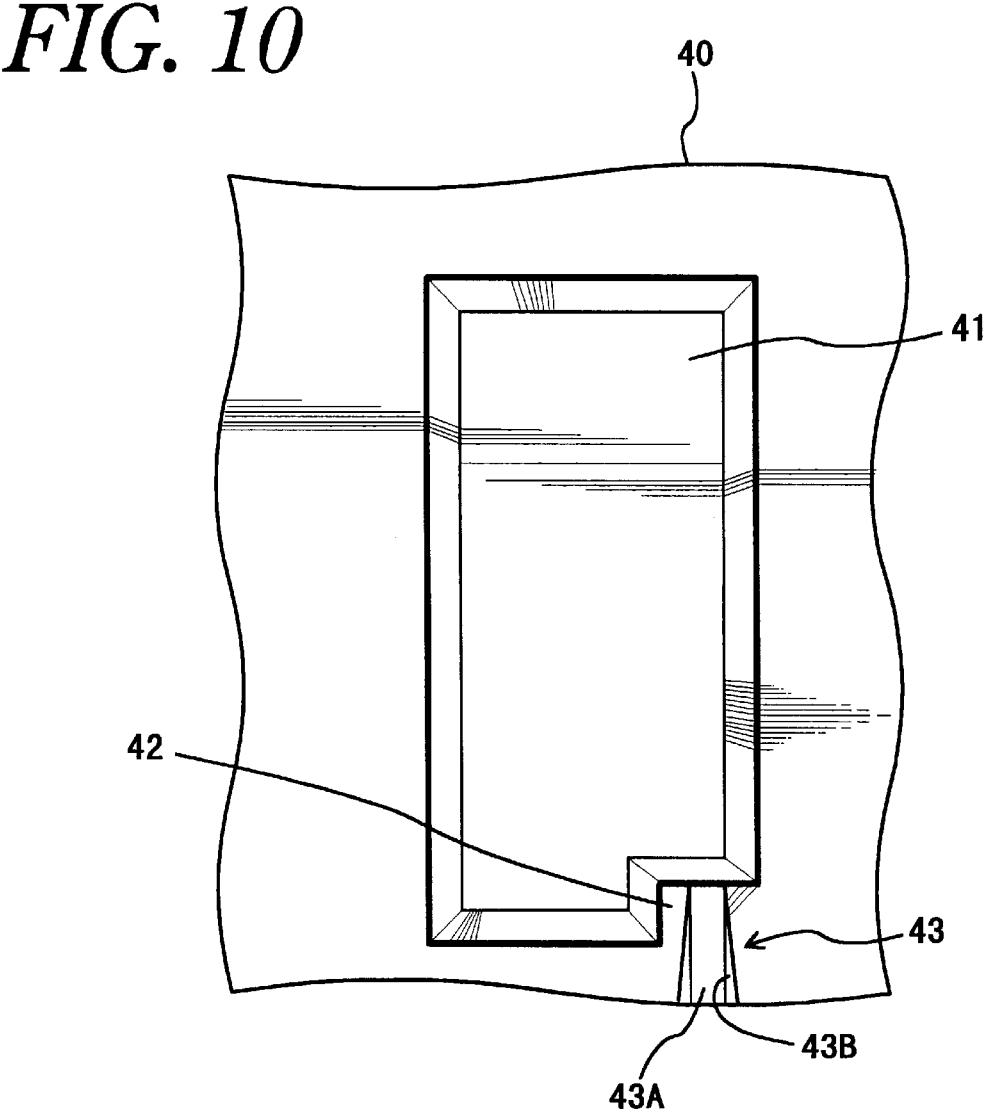
FIG. 10 is a plan view illustrating a lower die of a molding die set, according to a second preferred embodiment of the invention.

FIG. 10 shows a lower die 40 of a molding die set according to a second preferred embodiment of the invention. In the second preferred embodiment, the same and corresponding elements to the first preferred embodiment are represented by the same reference numbers. Also in the second preferred embodiment, only the difference from the first preferred embodiment will be descried to avoid redundant description. That is, the difference between the first and second preferred embodiments is the position of the gate (24, 43).

Figure 11:
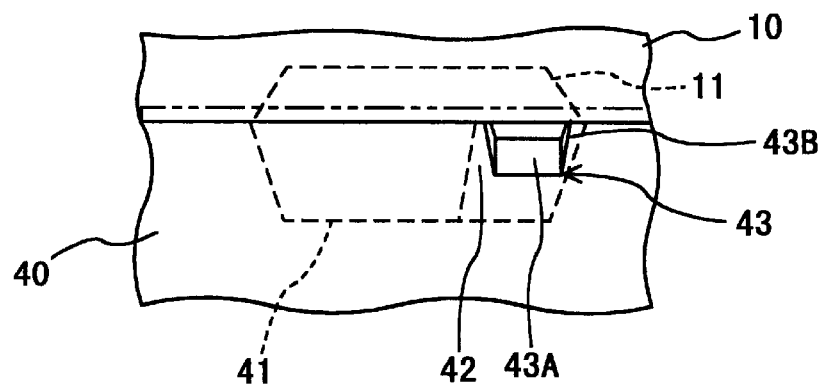
FIG. 11 is a side view illustrating a gate of the lower die, according to the second preferred embodiment of the invention.

The lower cavity 40 is provided with a projection region 42 that is projecting inwardly around a corner of a shorter side of a lower cavity 41. The projection region 42 is arranged to have an end which is to be positioned close to an inner lead of the IC. The lower cavity 40 is also provided with a gate 43 arranged to extend to the end of the projection region 42. The gate 43 has a tapered bottom surface 43A and tapered side surfaces 43B. As shown in FIG. 11, the bottom surface 43A is tapered upwardly to the upper cavity 11 of the upper die 10. The side surfaces 43B are tapered inwardly to the bottom surface 43A.

In the same manner as the first preferred embodiment, when plasticized resin is transferred into the upper and lower cavities 11 and 41, the plasticized resin is uniformly filled in the upper and lower cavities 11 and 41; and therefore, no air is left in the cavities 11 and 41.

Figure 12:
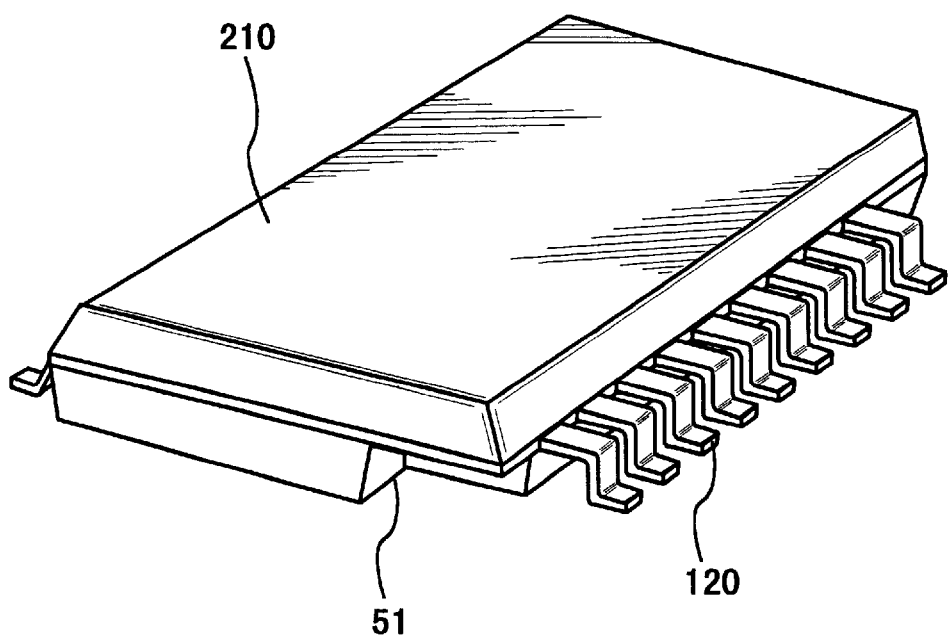
FIG. 12 is a perspective view illustrating a mold package fabricated with the molding die set, according to the second preferred embodiment of the invention.

FIG. 12 shows a mold package 210 fabricated using the lower die 40, shown in FIGS. 10 and 11. The mold package 210 is provided with outer leads 120 extending therefrom. The mold package 210 is also provided with a depressed portion 51, which corresponds to the projection region 42 of the lower die 40.

According to the second preferred embodiment, the chance of voids made in the mold package 210 can be reduced. And therefore, the IC stored in the mold package 210 can operate with a high reliability.

Figure 13:
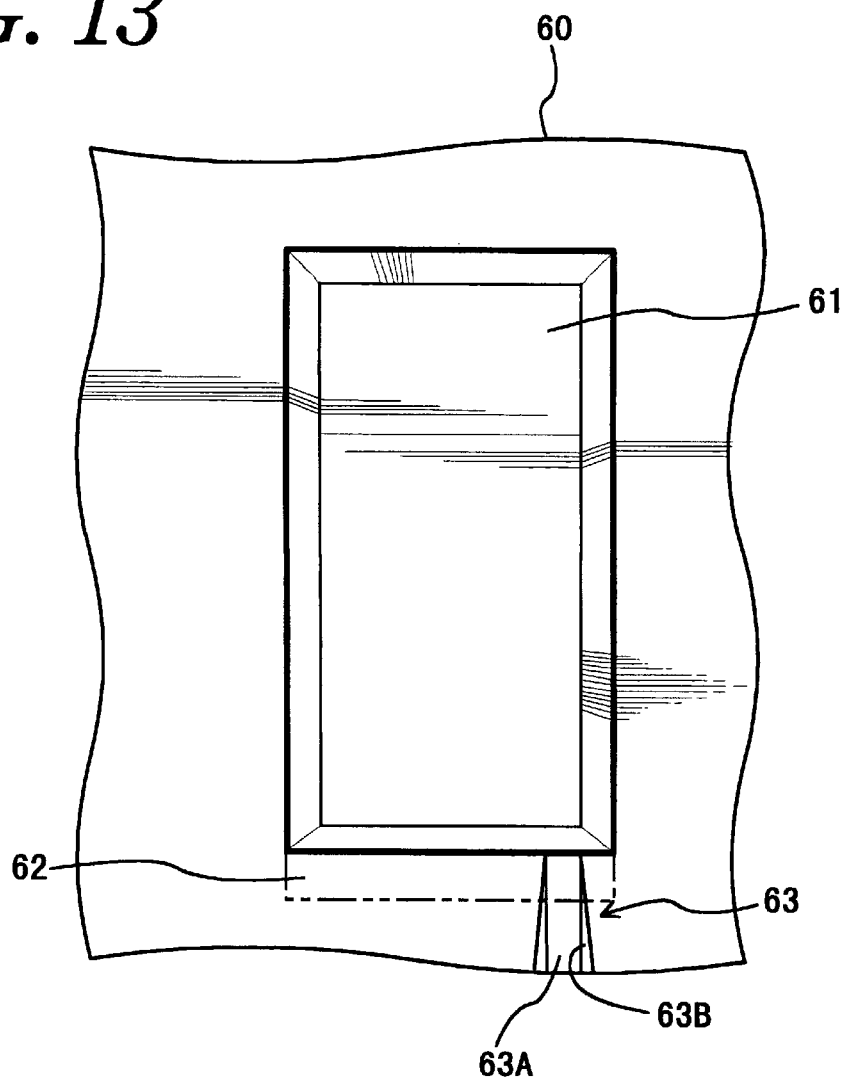
FIG. 13 is a plan view illustrating a lower die of a molding die set, according to a third preferred embodiment of the invention.

FIG. 13 shows a lower die 60 of a molding die set according to a third preferred embodiment of the invention. In the third preferred embodiment, the same and corresponding elements to the first preferred embodiment are represented by the same reference numbers. Also in the third preferred embodiment, only the difference from the first preferred embodiment will be descried to avoid redundant description. That is, the difference between the first and third preferred embodiments is the position of the gate (24, 63).

Figure 14:
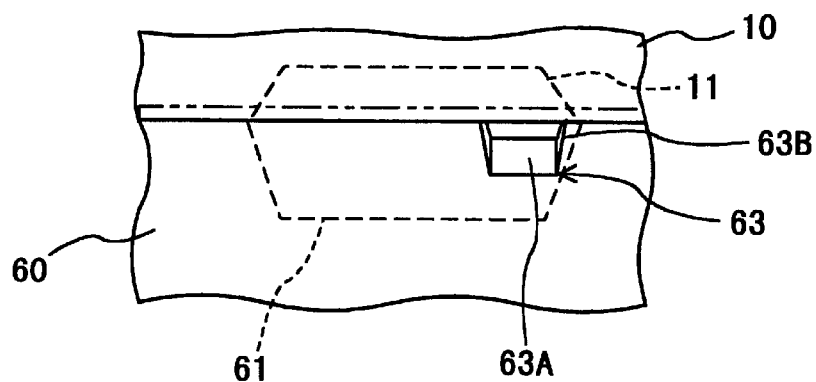
FIG. 14 is a side view illustrating a gate of the lower die, according to the third preferred embodiment of the invention.

The lower cavity 60 is provided with a projection region 62 that is inwardly projecting throughout a shorter side of a lower cavity 61. The projection region 62 is arranged to have an end which is to be positioned close to an inner lead of the IC. The lower cavity 60 is also provided with a gate 63 designed to extend to the end of the projection region 62. The gate 63 has a tapered bottom surface 63A and tapered side surfaces 63B. As shown in FIG. 14, the bottom surface 63A is tapered upwardly to the upper cavity 11 of the upper die 10. The side surfaces 63B are tapered inwardly to the bottom surface 63A.

In the same manner as the first preferred embodiment, when plasticized resin is transferred into the upper and lower cavities 11 and 61, the plasticized resin is uniformly filled in the upper and lower cavities 11 and 61; and therefore, no air is left in the resin.

Figure 15:
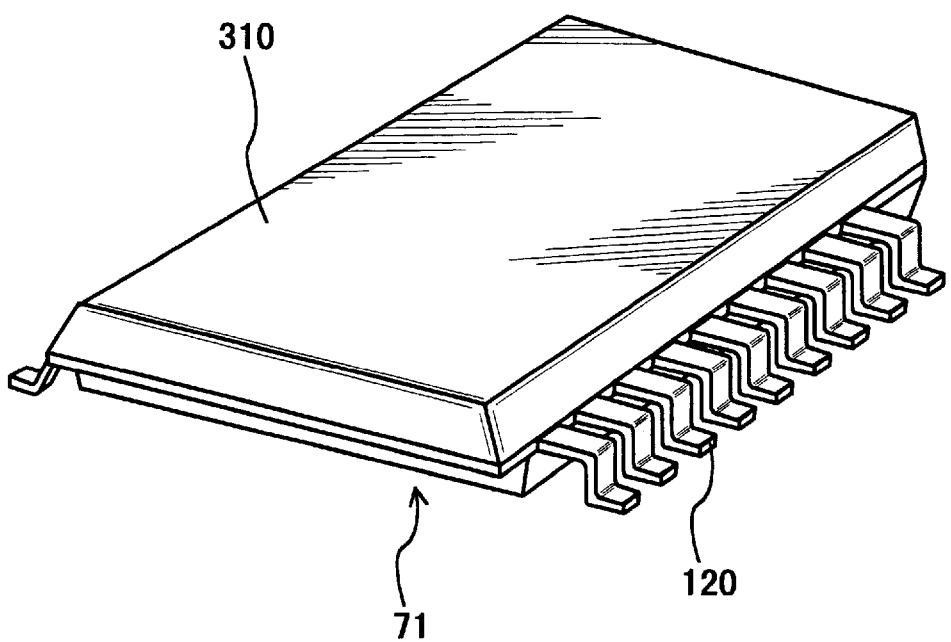
FIG. 15 is a perspective view illustrating a mold package fabricated with the molding die set, according to the third preferred embodiment of the invention.

FIG. 15 shows a mold package 310 fabricated using the lower die 60, shown in FIGS. 13 and 14. The mold package 310 is provided with outer leads 120 extending therefrom. The mold package 310 is also provided with a depressed portion 71, which corresponds to the projection region 62 of the lower die 60.

According to the third preferred embodiment, the chance of voids made in the mold package 310 can be reduced. And therefore, the IC stored in the mold package 310 can operate with high reliability. In addition, the projection region 62 is arranged throughout the shorter side of the lower cavity 61, so that the gate 63 can be placed anywhere in the projection region 62 without any restriction.

It will be understood that the above description of the present invention is susceptible to various modifications, changes and adaptations, and the same are intended to be comprehended with the meaning and range of equivalents of the appended claims. For example, the projection regions (22, 42, 62) can be shaped to have a circular arc end. The invention can be applied not only to a mold package for a semiconductor device (IC) but also to a molding package for any other electronics devices.

What is claimed is:

1. A molding die set used for fabricating a mold package, which protects an IC (Integrated Circuit) therein, comprising:

an upper die which comprises an upper cavity; and a lower die which comprises a lower cavity arranged to face the upper cavity, and a gate which guides plasticized resin into the lower cavity and the upper cavity, wherein the lower cavity is provided with a projection region which is projecting inwardly; and the gate is arranged to be extending in the projection region.

2. The molding die set, according to claim 1, wherein the gate is arranged close to an inner lead of the IC so that the plasticized resin is equally transferred into the upper cavity and the lower cavity.

3. The molding die set, according to claim 1, wherein each of the upper and the lower cavity is shaped rectangular, and the projection region is arranged around the center of a shorter side of the lower cavity.

4. The molding die set, according to claim 1, wherein each of the upper and the lower cavity is shaped rectangular, and the projection region is arranged around a corner of a shorter side of the lower cavity.

5. The molding die set, according to claim 1, wherein each of the upper and the lower cavity is shaped rectangular, and the projection region is arranged throughout a shorter side of the lower cavity.

6. The molding die set, according to claim 1, wherein the gate is provided with a bottom surface which is tapered upwardly to the upper cavity.

7. The molding die set, according to claim 6, wherein the gate is provided with side surfaces which are tapered inwardly to the bottom surface thereof.

8. A mold package protecting an IC (Initegrated Circuit), which is fabricated using a molding die set, wherein the molding die set comprises:

(1) an upper die which comprises an upper cavity; and
(2) a lower die which comprises a lower cavity arranged to face the upper cavity, and a gate which guides plasticized resin into the lower cavity and the upper cavity, wherein the lower cavity is provided with a projection region which is projecting inwardly; and the gate is arranged to be extending in the projection region.

9. The mold package, according to claim 8, wherein the gate is arranged close to an inner lead of the IC so that the plasticized resin is equally transferred into the upper cavity and the lower cavity.

10. The mold package, according to claim 8, wherein each of the upper and the lower cavity is shaped rectangular, and the projection region is arranged around the center of a shorter side of the lower cavity.

11. The mold package, according to claim 8, wherein each of the upper and the lower cavity is shaped rectangular, and the projection region is arranged around a corner of a shorter side of the lower cavity.

12. The mold package, according to claim 8, wherein each of the upper and the lower cavity is shaped rectangular, and the projection region is arranged throughout a shorter side of the lower cavity.

13. The mold package, according to claim 8, wherein the gate is provided with a bottom surface which is tapered upwardly to the upper cavity.

14. The mold package, according to claim 13, wherein the gate is provided with side surfaces which are tapered inwardly to the bottom surface thereof.

15. A molding system for fabricating a mold package protecting an IC (Integrated Circuit), comprising:

an upper die which comprises an upper cavity;

a lower die which comprises a lower cavity arranged to face the upper cavity, and a gate which guides plasticized resin into the lower cavity and the upper cavity; and a resin supply which supplies the plasticized resin to the gate, wherein the lower cavity is provided with a projection region which is projecting inwardly; and the gate is arranged to be extending in the projection region.

16. The molding system, according to claim 15, wherein the gate is arranged close to an inner lead of the IC so that the plasticized resin is equally transferred into the upper cavity and the lower cavity.

17. The molding system, according to claim 15, wherein each of the upper and the lower cavity is shaped rectangular, and the projection region is arranged around the center of a shorter side of the lower cavity.

18. The molding system, according to claim 15, wherein each of the upper and the lower cavity is shaped rectangular, and the projection region is arranged around a corner of a shorter side of the lower cavity.

19. The molding system, according to claim 15, wherein each of the upper and the lower cavity is shaped rectangular, and the projection region is arranged throughout a shorter side of the lower cavity.

20. The molding system, according to claim 15, wherein the gate is provided with a bottom surface which is tapered upwardly to the upper cavity.

21. The molding system, according to claim 20, wherein the gate is provided with side surfaces which are tapered inwardly to the bottom surface thereof.

* * * * *